United States Patent [19]

Manning

[11] Patent Number: 5,126,604

[45] Date of Patent: Jun. 30, 1992

[54] LINEAR MOTOR CONVEYANCE SYSTEM

[75] Inventor: Michael J. N. Manning, Warwickshire, England

[73] Assignee: GEC Alsthom Limited, England

[21] Appl. No.: 612,868

[22] Filed: Nov. 13, 1990

[30] Foreign Application Priority Data

Nov. 10, 1989 [GB] United Kingdom ................ 892550

[51] Int. Cl.$^5$ ........................................... H02K 41/00
[52] U.S. Cl. ........................................ 310/12; 310/17
[58] Field of Search ................. 310/12, 13, 14, 15, 310/19, 22, 23, 24, 28, 29, 181, 209; 187/17, 19, 95, 96, 98

[56] References Cited

U.S. PATENT DOCUMENTS

| 4,641,065 | 2/1987 | Shibuki et al. | 310/13 |
| 4,803,387 | 2/1989 | Seider | 310/12 |
| 4,972,108 | 11/1990 | Venturini | 310/12 |
| 4,985,651 | 1/1991 | Chitayat | 310/12 |

FOREIGN PATENT DOCUMENTS 1148497 4/1969 United Kingdom .
1208201 10/1970 United Kingdom .

OTHER PUBLICATIONS

IBM Tech. Disclosure Bulletin vol. 31, No. 2, Jul. 1988, Flexible Band Transport System; pp. 38–40.

Primary Examiner—R. Skudy
Attorney, Agent, or Firm—Kirschstein, Ottinger, Israel & Schiffmiller

[57] ABSTRACT

The linear motor conveyance system is intended to power conveyance in shafts, typically mine shafts. The system includes spaced apart, parallel winding support members 10 carrying stator windings and extending in the direction of the shaft. A reaction member 16 is located between the winding support members 10 so as to be driven along the shaft by electromagnetic forces. The reaction member 16 is composed of a number of reaction elements, typically permanent magnets 18, which are arranged in groups 20. The groups are articulated to one another to take account of shaft inaccuracies.

10 Claims, 2 Drawing Sheets

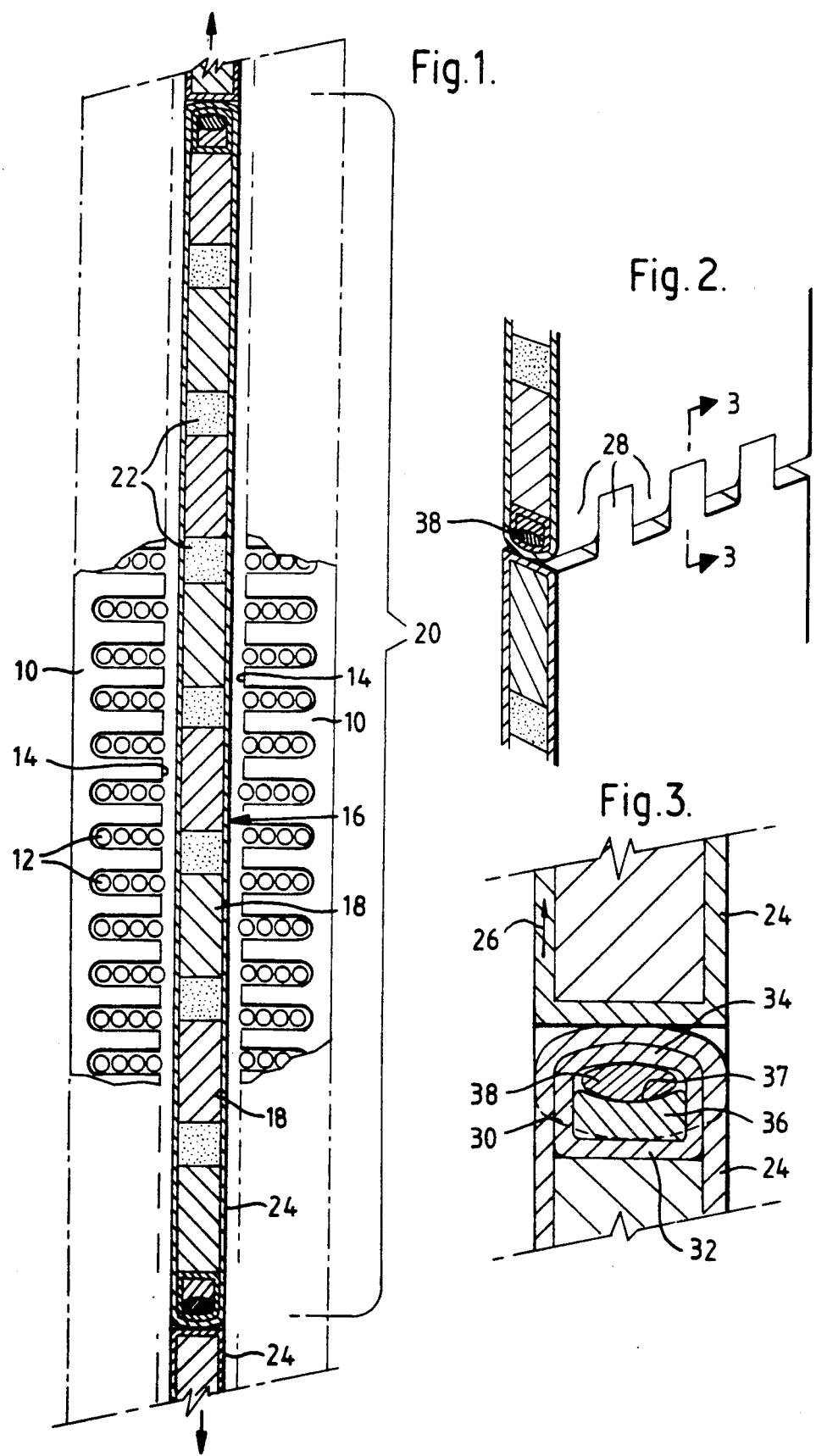

LINEAR MOTOR CONVEYANCE SYSTEM

BACKGROUND OF THE INVENTION

1. Field of the Invention

This invention relates to a linear motor conveyance system. In one application, the system of the invention is suitable for powering mine conveyances in mine shafts.

2. Description of Related Art

Mine shafts are generally deep and subject to irregularities in their straightness. Irregularities can arise during sinking of the shaft, during installation of supportwork in the shaft, and also subsequently as a result of underground rock movements and so forth. Because of such irregularities conventional linear motor arrangements are not really suitable for powering mine conveyances, such as personnel cages and ore skips, up and down the shaft.

SUMMARY OF THE INVENTION

According to the present invention, there is provided a linear motor conveyance system for a shaft, the system comprising spaced apart, parallel winding support members carrying stator windings and extending longitudinally in the shaft, and a reaction member located between the winding support members so as to be driven in the longitudinal direction of the shaft by electromagnetic forces, the reaction member comprising a plurality of reaction elements arranged in groups, each group of reaction elements being encased by a casing, and the individual casings being articulated to one another by means of pin joints.

In a preferred version of the invention, the pin joints comprise lenticular pins, although circular pin joints are also possible within the scope of the invention.

The casings themselves may be made of plastics material reinforced by long strand glass fibres.

The pin joints between encased groups of reaction elements may comprise intercalated lugs provided by the casings and means in the lugs defining cavities shaped to accommodate the pins, lenticular or otherwise.

It is preferred that the pins are arranged with their axes extending in a direction transverse to the longitudinal direction (conveyance direction) and lying in a plane parallel to inwardly directed, opposing faces of the winding support members.

BRIEF DESCRIPTION OF THE DRAWINGS

The invention will now be described in more detail, by way of example only, with reference to the accompanying drawings in which:

FIG. 1 shows a partial side elevation of a linear motor conveyance system of the invention;

FIG. 2 shows a perspective view of one lenticular pin joint;

FIG. 3 shows a cross-section at the line 3—3 in FIG. 2; and

DETAILED DESCRIPTION OF THE PREFERRED EMBODIMENT

Figure 4:
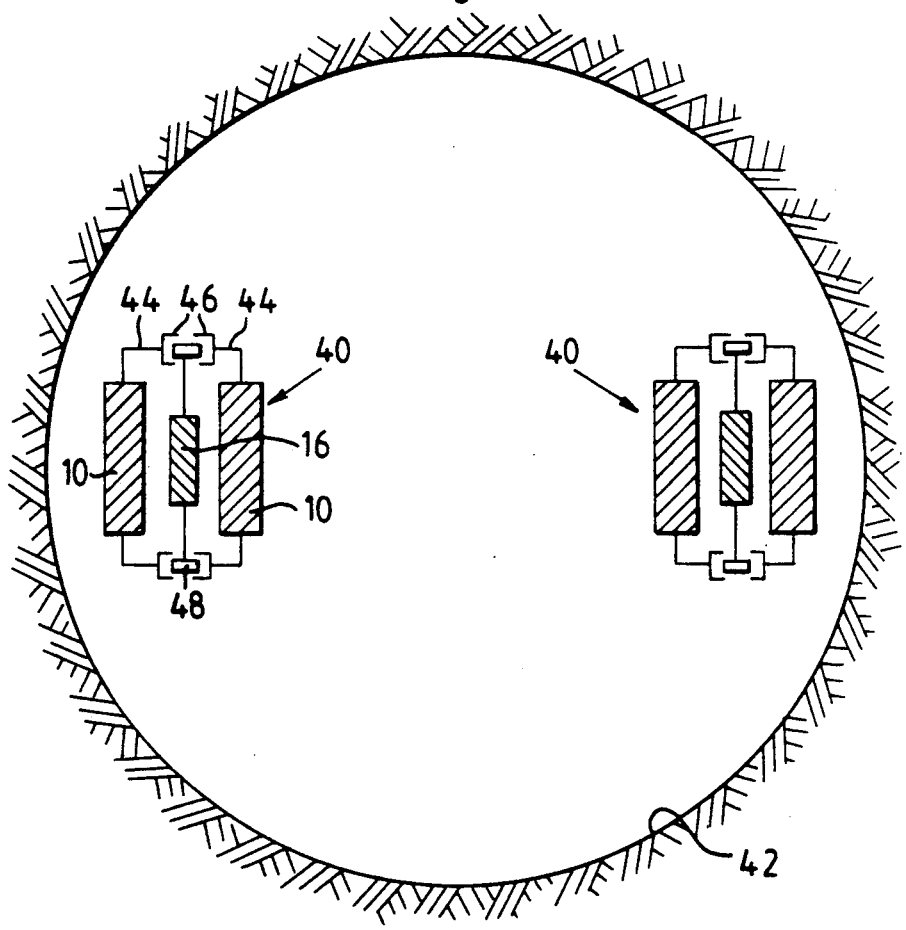
FIG. 4 shows a diagrammatic plan view illustrating the conventional guidance system.

FIG. 1 shows two elongate-winding support members or stators 10 which extend vertically in, say, a mine shaft. The winding support members 10 carry electrical windings 12. They extend parallel to one another and have spaced apart, inwardly directed, parallel faces 14 facing in opposite directions.

Between the winding support members or stators is a reaction member indicated generally with the reference numeral 16. The reaction member 16 comprises a number of individual reaction elements 18, in this case in the form of permanent magnets. In conjunction with the stators, the reaction member 16 constitutes a synchronous motor in which the reaction member can be driven in the indicated directions by electromagnetic forces. Each magnet 18 as seen in FIG. 1 can be made up of two or more magnet plates arranged in a side-by-side laminated or other interconnected construction.

The reaction member 16 is composed of a series of groups 20 each of which contains a number of the magnets 18. In each group 20, the magnets 18 are spaced apart from one another by non-magnetic spacers 22. The magnets 18 and spacers 22 are held together in each group 20 by means of a carrier or casing 24 which is made of glass fibre reinforced plastics material. The glass fibres are long strand fibres and extend in the manner indicated by the arrow 26 in FIG. 3. The glass fibres give the casing considerable strength in the longitudinal direction but, with some resilience of the plastics material, allow for some flexibility of the group 20 about a transverse axis which is into the plane of the paper in FIG. 1.

Provision is made at each end of each group 20 for a lenticular pin joint. The nature of this joint will be apparent from FIGS. 2 and 3 which show that the basic component of the joint is a lenticular pin 38, i.e. a pin which is elliptical in cross-section. The groups 20 are formed with lugs 28 at their ends, the lugs 28 of adjacent groups 20 intercalating with one another as indicated in FIG. 2. The lugs 28 are constituted by shaped end portions of the casing 24 defining cavities (not identified in the drawings) which accommodate yokes 30 each having a flat section 32 and an elliptical section 34. Inserts 36 are located inside the yokes 30 and provide elliptical surfaces 37. Each lenticular pin 38 is sandwiched between the elliptical section 34 of a yoke 30 and the surface 37 of an insert and extends right through all the lugs to provide a pivotal joint.

Referring to FIG. 3, it will be seen that the pin 38 has a central region in which the curvature of the pin surface is greater than the corresponding contact regions of the insert and yoke. With this arrangement, pivotal movement between adjacent groups 20 takes place by way of a rolling movement between the pin and the insert and yoke, rather than by a sliding movement of the surfaces relative to one another, at least over limited angles of relative pivotal movement It is believed that this feature will contribute to longevity of each pin joint.

In practice, in the case of a mine shaft, there will be a synchronous motor as described above on each side of the relevant compartment in the mine shaft. Mine conveyances such as cages or skips, will be located between the motors and suspended pivotally from the reaction members 16 of each motor so as to be powered up and down the relevant shaft compartment in use. The pivotal connections for the conveyance could also be in the form of lenticular pin joints for improved longevity.

FIG. 4 shows a diagrammatic plan view of the open mine shaft application with two synchronous motors 40, as described above, one on each side of the shaft 42. In practice, there will usually be a number of separate compartments in the mine shaft, each compartment accommodating motors and conveyances, but FIG. 4, in the interests of simplicity, shows only one motor pair. The stators carry brackets 44 and rails 46 between which wheels 48 fitted to the reaction member 16 at suitable intervals can ride. The arrangement of wheels and rails ensures that the reaction member rides centrally between the stators 10.

Furthermore, the articulation permitted by the lenticular pin joints in the reaction member 16 will endow the reaction members with the facility to flex to take account of variations in the straightness of the shaft and hence of the stators 10.

It is anticipated that a linear motor as described could find application in other shaft applications, for instance, lift shafts in high rise buildings and the like where construction inaccuracies could result in inaccuracies in shaft straightness. Another possible application is in the disposal of toxic waste in deep shafts, such as disused mine shafts.

I claim:

1. A linear motor conveyance system for an open shaft having a longitudinal direction, said system comprising:
   (A) spaced apart, parallel winding support members carrying stator windings, said support members extending longitudinal in said shaft;
   (B) a reaction member for supporting conveyance means, said reaction member being located between said winding support members so as to be driven in the longitudinal direction of said shaft by electromagnetic forces, said reaction member including:
      (i) a plurality of reaction elements arranged in groups of said reaction elements,
      (ii) a plurality of casings, each of said groups being encased by a respective casing, and
      (iii) said casings being arranged in a sequence and each of said casings being articulated to the next in said sequence by a respective pin joint.

2. A linear motor conveyance system according to claim 1, wherein said pin joints between encased said groups of said reaction elements comprise intercalated lugs provided by said casings and means in each of said lugs defining a cavity shaped to accommodate a pin.

3. A linear motor conveyance system according to claim 2, wherein each said pin is a lenticular pin having elliptical surface.

4. A linear motor conveyance system according to claim 3, wherein said means in each of said lugs said defining cavity includes a yoke having an elliptical inner surface and an insert having an elliptical surface, said elliptical inner surface of the yoke and said elliptical surface of said insert being mutually opposed and between them locating said pin.

5. A linear motor conveyance system according to claim 4, wherein said pin has elliptical surfaces having a curvature and wherein said curvature is greater than a corresponding curvature of said elliptical inner surface of said yoke and said elliptical surface of said insert thereby resulting in an articulation at each said pin joint taking place by a rolling, as opposed to a sliding movement, at least over a limited range of said articulation.

6. A linear motor conveyance system according to claim 1, wherein said winding support members have opposing faces parallel to a plane extending between said opposing faces, and each said pin is arranged with its axis extending in a direction transverse to said longitudinal direction and lying in said plane.

7. A linear motor conveyance system according to claim 1, wherein each of said groups of said reaction elements comprises a plurality of said reaction elements spaced apart from one another by non-magnetic spacers.

8. A linear motor conveyance system according to claim 1, wherein each of said reaction elements comprises a permanent magnet.

9. A linear motor conveyance system according to claim 1, wherein each said casing is made of plastics reinforced by long strand glass fibers.

10. A linear motor conveyance system according to claim 1, wherein said conveyance means is a mine conveyance attached to said reaction member.

* * * * *

UNITED STATES PATENT AND TRADEMARK OFFICE
CERTIFICATE OF CORRECTION

PATENT NO. : 5,126,604
DATED : June 30, 1992
INVENTOR(S) : Michel J.N. Manning

It is certified that error appears in the above-indentified patent and that said Letters Patent is hereby corrected as shown below:

On the Title Page, Item
[30]   Nov. 10, 1989 (GB) United Kingdom ...8925505

Signed and Sealed this

Twenty-sixth Day of October, 1993

*Attest:*

BRUCE LEHMAN

*Attesting Officer*   *Commissioner of Patents and Trademarks*